United States Patent
Walker et al.

(10) Patent No.: US 10,696,373 B2
(45) Date of Patent: Jun. 30, 2020

(54) AIRCRAFT WINGS AND AIRCRAFT INCLUDING SUCH AIRCRAFT WINGS

(71) Applicant: The Boeing Company, Chicago, IL (US)

(72) Inventors: Steven P. Walker, Arlington, WA (US); Forouzan Behzadpour, Woodinville, WA (US); Gary D. Oakes, Renton, WA (US); Ian E. Schroeder, Seattle, WA (US); Patrick B. Stickler, Everett, WA (US); Jason H. Inouye, Bellvue, WA (US)

(73) Assignee: The Boeing Company, Chicago, IL (US)

( * ) Notice: Subject to any disclaimer, the term of this patent is extended or adjusted under 35 U.S.C. 154(b) by 860 days.

(21) Appl. No.: 15/264,209

(22) Filed: Sep. 13, 2016

(65) Prior Publication Data

US 2018/0072399 A1     Mar. 15, 2018

(51) Int. Cl.
*B64C 3/18*     (2006.01)
*B64C 1/26*     (2006.01)
(Continued)

(52) U.S. Cl.
CPC ............... *B64C 3/187* (2013.01); *B64C 1/26* (2013.01); *B64C 3/182* (2013.01); *B64C 3/26* (2013.01);
(Continued)

(58) Field of Classification Search
CPC .. B64C 1/26; B64C 3/26; B64C 3/187; B64C 3/182; B64C 1/064; B64C 3/18; B64C 3/185; B64C 3/22
See application file for complete search history.

(56) References Cited

U.S. PATENT DOCUMENTS

| | | | |
|---|---|---|---|
| 2,367,750 A * | 1/1945 | Berkow | B64C 3/00 114/78 |
| 5,944,286 A * | 8/1999 | Morris | B64C 3/187 244/131 |

(Continued)

FOREIGN PATENT DOCUMENTS

| | | | |
|---|---|---|---|
| EP | 2835310 | 11/2015 | |
| EP | 3040268 A1 * | 7/2016 | B64C 3/182 |

(Continued)

OTHER PUBLICATIONS

European Patent Office, "Extended European Search Report," issued in connection with European Patent Application No. 17190474.1, on Nov. 2, 2017, 7 pages.

*Primary Examiner* — Richard R. Green
(74) *Attorney, Agent, or Firm* — Hanley, Flight & Zimmerman, LLC

(57) ABSTRACT

Aircraft wings and aircraft including such aircraft wings are disclosed. An example apparatus includes an aircraft wing having a first panel; a second panel; ribs coupled between the first and second panels; and stiffeners coupled between the ribs in a spanwise direction and to the first panel, the coupling between the stiffeners and the first panel to deter axial loads from being received by the stiffeners, the stiffeners to increase a compressional stability of the first panel, wherein the coupling between the stiffeners and the first panel are indirect couplings formed via clips, the couplings formed via the clips deter the axial loads from being received by the stiffeners while increasing the compressional stability of the first panel.

19 Claims, 16 Drawing Sheets

(51) Int. Cl.
*B64C 3/26* (2006.01)
*B64C 1/00* (2006.01)
*B64C 1/06* (2006.01)

(52) U.S. Cl.
CPC ...... *B64C 1/064* (2013.01); *B64C 2001/0072* (2013.01)

(56) References Cited

U.S. PATENT DOCUMENTS

| | | | | |
|---|---|---|---|---|
| 7,546,979 | B1 * | 6/2009 | Estell | B64C 1/26 244/123.1 |
| 7,635,106 | B2 * | 12/2009 | Pham | B64C 3/26 244/123.1 |
| 7,686,251 | B2 * | 3/2010 | Tanner | B64C 3/187 244/123.1 |
| 7,721,995 | B2 * | 5/2010 | Tanner | B64C 3/182 244/132 |
| 8,720,825 | B2 | 5/2014 | Kismarton | |
| 8,915,471 | B2 * | 12/2014 | Nordman | B64C 1/26 244/131 |
| 8,985,515 | B2 * | 3/2015 | McCullough | B64C 1/06 244/131 |
| 9,004,406 | B2 * | 4/2015 | Soenarjo | B64C 1/26 244/123.1 |
| 9,272,769 | B2 | 3/2016 | Lin et al. | |
| 9,475,570 | B2 * | 10/2016 | Charles | B64C 3/187 |
| 2014/0145032 | A1 | 5/2014 | Moselage, III | |

FOREIGN PATENT DOCUMENTS

| | | |
|---|---|---|
| EP | 3045384 | 7/2016 |
| WO | 2008054499 | 5/2008 |
| WO | 2011071939 | 6/2011 |

* cited by examiner

AIRCRAFT WINGS AND AIRCRAFT INCLUDING SUCH AIRCRAFT WINGS

FIELD OF THE DISCLOSURE

This disclosure relates generally to aircraft and, more particularly, to aircraft wings and aircraft including such aircraft wings.

BACKGROUND

Some aircraft include wings having upper and lower panels, ribs, spars and stringers. In some examples, the stringers are directly coupled to the upper and lower panels to enable loads (e.g., axial loads, bending loads) to be received and directed toward the ribs.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
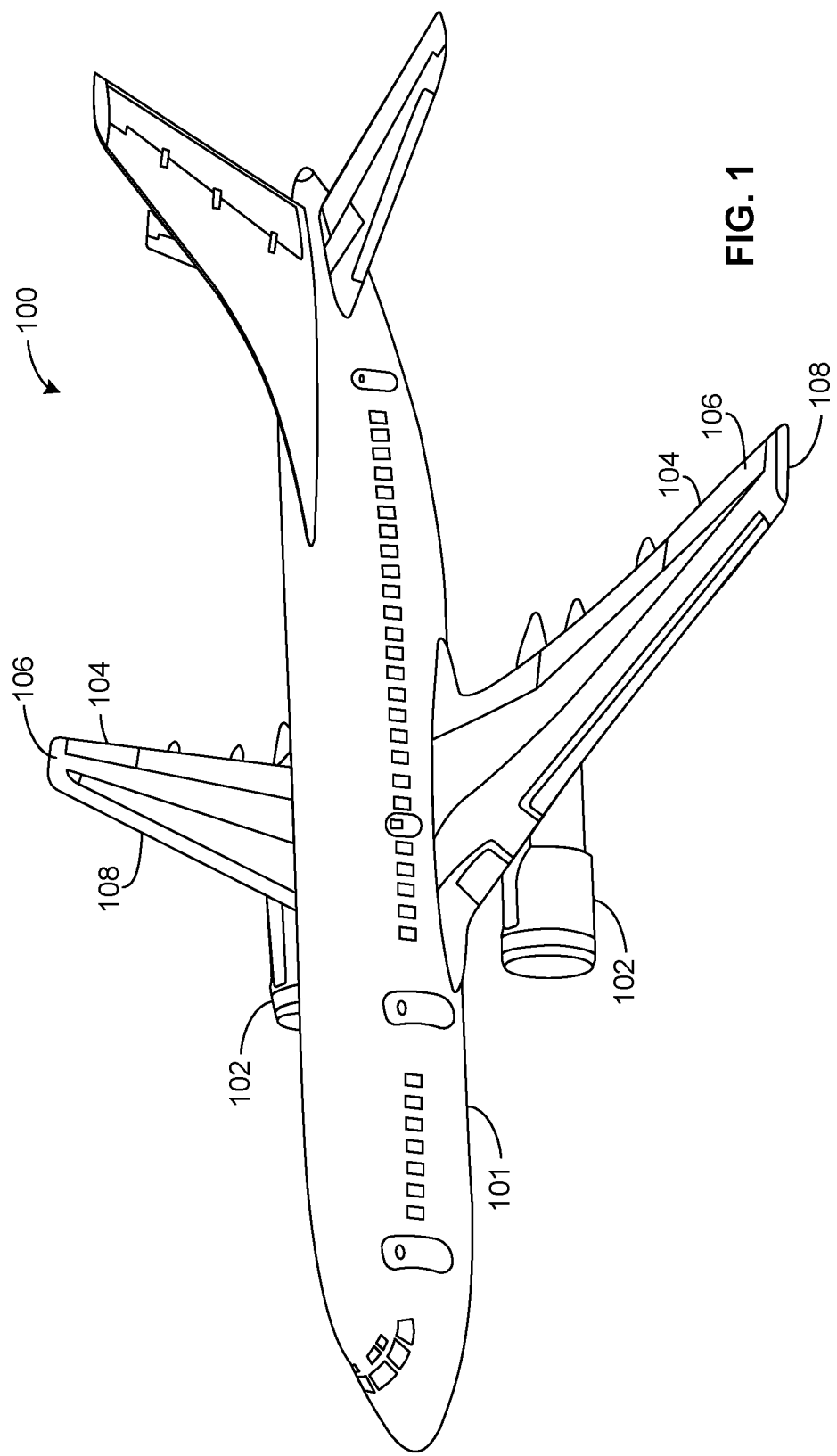
FIG. 1 is a schematic illustration of an example aircraft including example wings configured in accordance with the teachings of the disclosure.

The examples disclosed herein relate to aircraft including wings that are stiffened using non-integral stiffeners that are relatively small, easy to manufacture and/or use. The wings may include composite and/or carbon fiber reinforced plastic (CFRP). Thus, using the examples disclosed herein, a lighter weight wing may be achieved at a relatively lower cost than many known wings.

In some examples, the example non-integral stiffeners provide compression stability and/or out-of-plane restraint of carbon fiber wing panel(s) to which the stiffener(s) is coupled. In contrast to stringers that are integrally formed and/or coupled to the wing panel, example stiffeners (e.g., discrete stiffeners) produced in accordance with the teachings of this disclosure may be configured to not receive substantial axial loading from the wing panels. As used herein, not receiving substantial axial loading from the wing panels means that the example stiffeners may receive a nominal amount of axial loading from the wing panels and/or are not purposed to receive and/or transfer axial loading from the wing panels to other structural components (e.g., the ribs, etc.) of the wing and/or aircraft. As such, implementing aircraft with the examples disclosed herein may reduce the part count and/or reduce the overall complexity of the wing and/or aircraft.

In some examples, by configuring the stiffeners to not receive axial loads from the wing panels, such loading travels within the wing panels toward an example side of body interface. In some examples, the side of body interface includes an example continuous side of body web (e.g., an unstiffened side of body web) that extends aft through an example trapezoidal panel and/or fittings. The positioning of the side of body web through the trapezoidal fittings enables forces to be directed through the example side of body web to a rear spar. In some examples, using an example side of body web that is integrally formed with an example trapezoidal fitting(s) enables some parts such as, for example, terminal fittings and/or additional joints to be eliminated.

In some examples, the wings include upper and lower panels, ribs that extend between the upper and lower panels and example stiffeners (e.g., intercostals) where the upper and lower panels are void of stringers. The upper and/or lower panels may be unstiffened wing panels and/or non-integrally stiffened wing panels. In some examples, the upper and lower panels are coupled to the respective stiffeners via fasteners and/or tee clips. In some examples, the stiffeners are non-rigidly coupled between the ribs in a spanwise direction to enable some movement to occur without impacting the structural integrity of the coupling between the stiffeners and the ribs and/or to deter the stiffeners from buckling. As used herein, the phrase "spanwise direction" refers to a direction between the wing tips of the aircraft and/or a direction between an inner portion of a wing and an outer portion (e.g., the tip) of the wing. Tear straps (e.g., integral tear straps) may be used to address the damage which may occur to wing panels during flight. In some examples, the wings and/or the side of body interfaces include carbon fiber reinforced plastic (CFRP) splice plates that are used to form a double-shear splice that deters corrosion.

FIG. 1 depicts an example aircraft 100 including an example fuselage 101 and example engines 102 coupled to example wings 104. In this example, the wings 104 include first and second panels 106, 108 that may be formed of a composite material and/or a carbon fiber reinforced plastic material.

Figure 2:
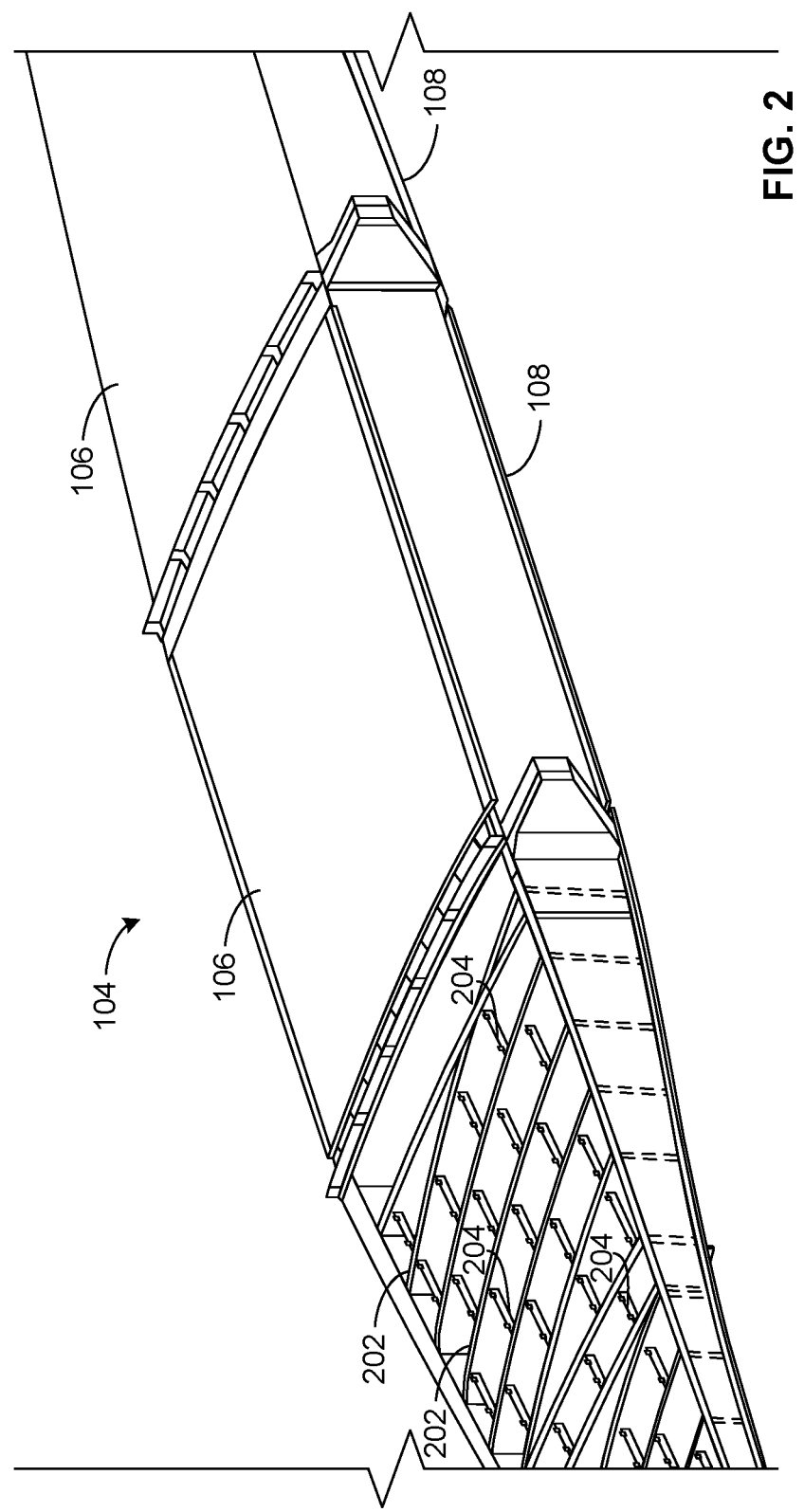
FIG. 2 illustrates a partial cutaway view of an example wing including example ribs and example stiffeners in accordance with the teachings of this disclosure.

FIG. 2 illustrates a partial cutaway view of one of the example wings 104 that can be used to implement the wings 104 of the aircraft 100 of FIG. 1. In the illustrated example, the wing 104 includes the first and second panels 106, 108 and ribs 202 that extend in a chordwise direction between the first and second panels 106, 108. To enable the first and second panels 106, 108 to be relatively thinner and/or to increase the stability of the respective panels 106, 108, in this example, example stiffeners and/or intercostals 204 are coupled spanwise between the ribs 202. In some examples, the stiffeners 204 are discreetly coupled between the ribs 202 and to the first panel 106 (e.g., the upper panel) to increase the compressional stability of the first panel 106 and/or to deter axial loading from being imparted on the stiffeners 204. In some examples, the stiffeners 204 are coupled immediately adjacent the first panel 106 and spaced from the second panel 108. In other examples, some of the stiffeners 204 are coupled immediately adjacent the first panel 106 and others of the stiffeners 204 are coupled immediately adjacent the second panel 108. However, given that the compressional loading at the first panel 106 (e.g., the upper panel) may be higher than the compressional loading at the second panel 108 (e.g., the lower panel), the stiffeners 204 may be provided immediately adjacent the first panel 106 and not provided immediately adjacent the second panel 108.

In some examples, given that the compressional loading of the panels 106, 108 closer to the fuselage 101 may be greater than the compressional loading of the panels 106, 108 farther from the fuselage 101, the stiffeners 204 may be more prevalent between the ribs 202 adjacent the fuselage 101 as compared to the number of stiffeners 204 further from the fuselage 101. In examples in which the panels 106 and/or 108 are relatively thicker and/or stiffer, fewer stiffeners 204 may be used to achieve a threshold compressional stability and/or threshold buckling deterrent of the panels 106, 108. In examples in which the panels 106, 108 are relatively thinner and/or less stiff, a greater number of stiffeners 204 may be used to achieve the threshold compressional stability and/or threshold buckling deterrent of the panels 106, 108. In either of these examples, the first and second panel 106, 108 may have the same or similar thicknesses. In other examples, the first and second panels 106, 108 may have varying thicknesses and/or different thicknesses.

Figure 3:
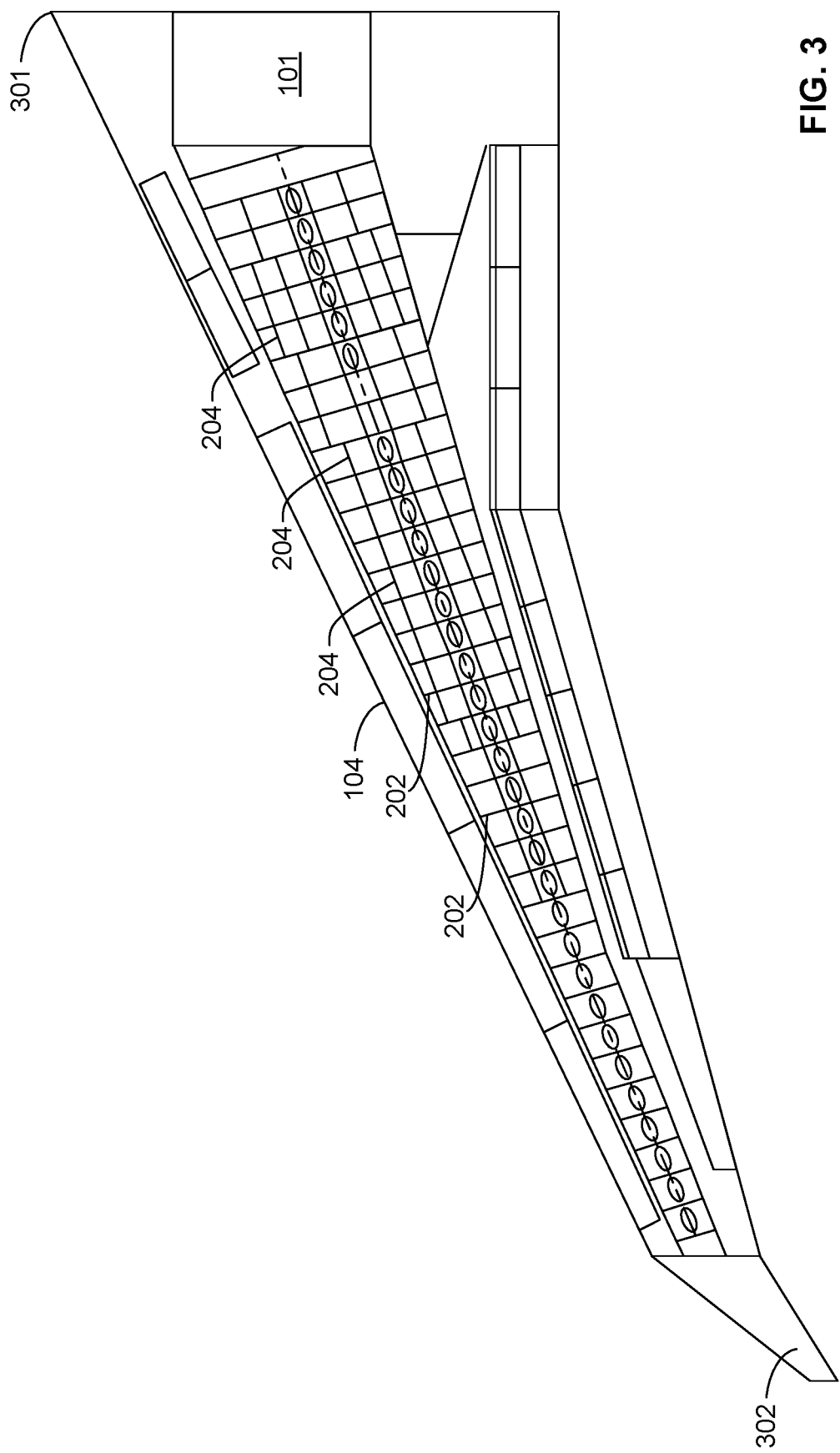
FIG. 3 illustrates a plan view of an example wing including example ribs and example stiffeners.

FIG. 3 illustrates a plan view of the example wing 104 that can be used to implement the wings 104 of the aircraft 100 of FIG. 1. In this example, the wing 104 includes the ribs 202 and the stiffeners 204 coupled between the respective ribs 202. As illustrated in the example of FIG. 3, a greater number of the stiffeners 204 are disposed between the ribs 202 adjacent the fuselage 101 and/or an inner portion 301 of the wing 104 and fewer stiffeners 204 are disposed adjacent a tip and/or outer portion 302 of the wing 104. While the stiffeners 204 are illustrated as being positioned in a particular pattern on the wing 104, the stiffeners 204 may be disposed between the ribs 202 in any configuration to satisfy the needs of a particular application.

Figure 4:
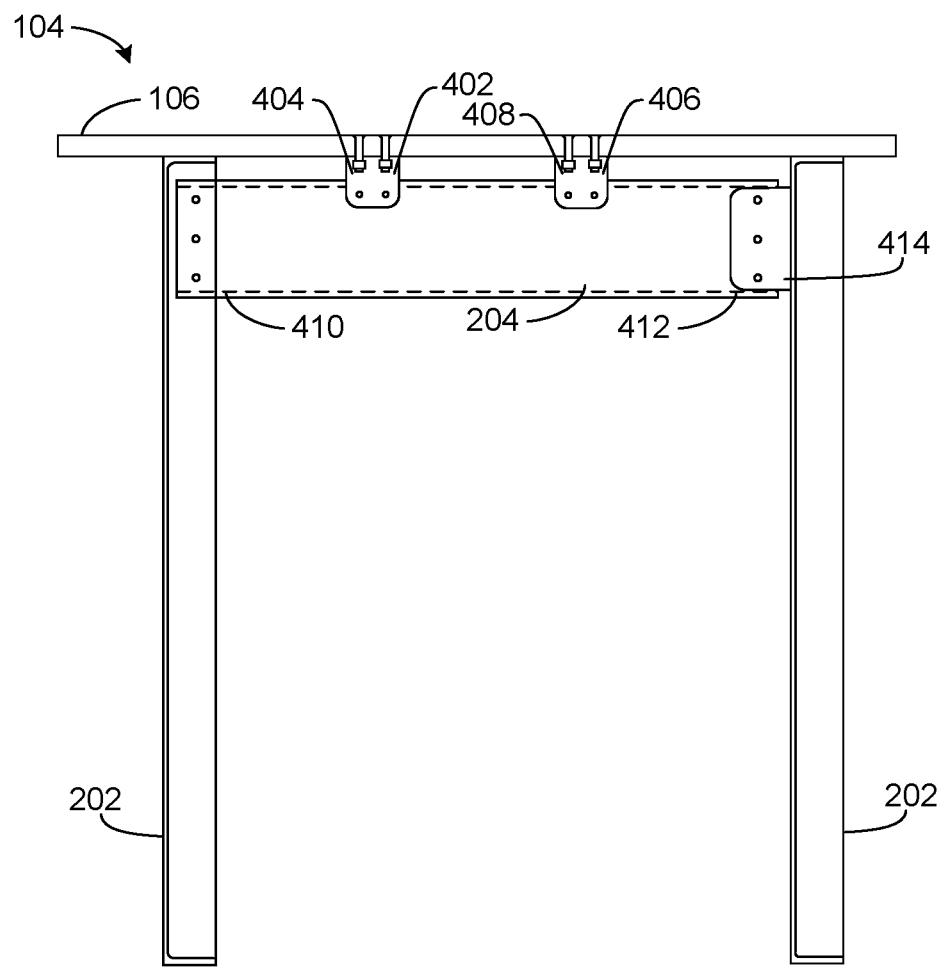
FIG. 4 illustrates an example stiffener coupled between example ribs and coupled to an example panel.

FIG. 4 illustrates a cross-sectional view of a coupling between one of the stiffeners 204, the ribs 202 and the first panel 106. In the illustrated example, the stiffener 204 is coupled to the first panel 106 at a first location 402 via a first tee clip and/or fastener 404 and a second location 406 via a second tee clip and/or fastener 408. In the illustrated example, a first end 410 of the stiffener 204 is coupled to the rib 202. In some examples, a rib stiffener may be coupled to the rib 202 at the first location 402 and the coupling between the rib 202 and the stiffener 204. In the illustrated example, a second end 412 of the stiffener 204 is coupled to a flange and/or angled sheet-metal 414 to enable the stiffener 204 to be non-rigidly coupled between the ribs 202 and/or to deter the stiffener 204 from buckling. In other words, the coupling of the stiffener 204 at the flange 414 and/or the material properties and/or flexibility of the flange 414 enables some movement between the ribs 202 to occur without negatively impacting the coupling between the stiffener 204 and the ribs 202, for example. In some examples, the flange 414 may be sized, shaped and/or have a thickness to enable the flange 414 to flex to enable some movement between the ribs 202 to occur without negatively impacting the coupling between the stiffener 204 and the ribs 202. In some examples, the flange 414 may be made of a material and/or have material properties that enables some movement between the ribs 202 to occur without negatively impacting the coupling between the stiffener 204 and the ribs 202.

Figure 5:
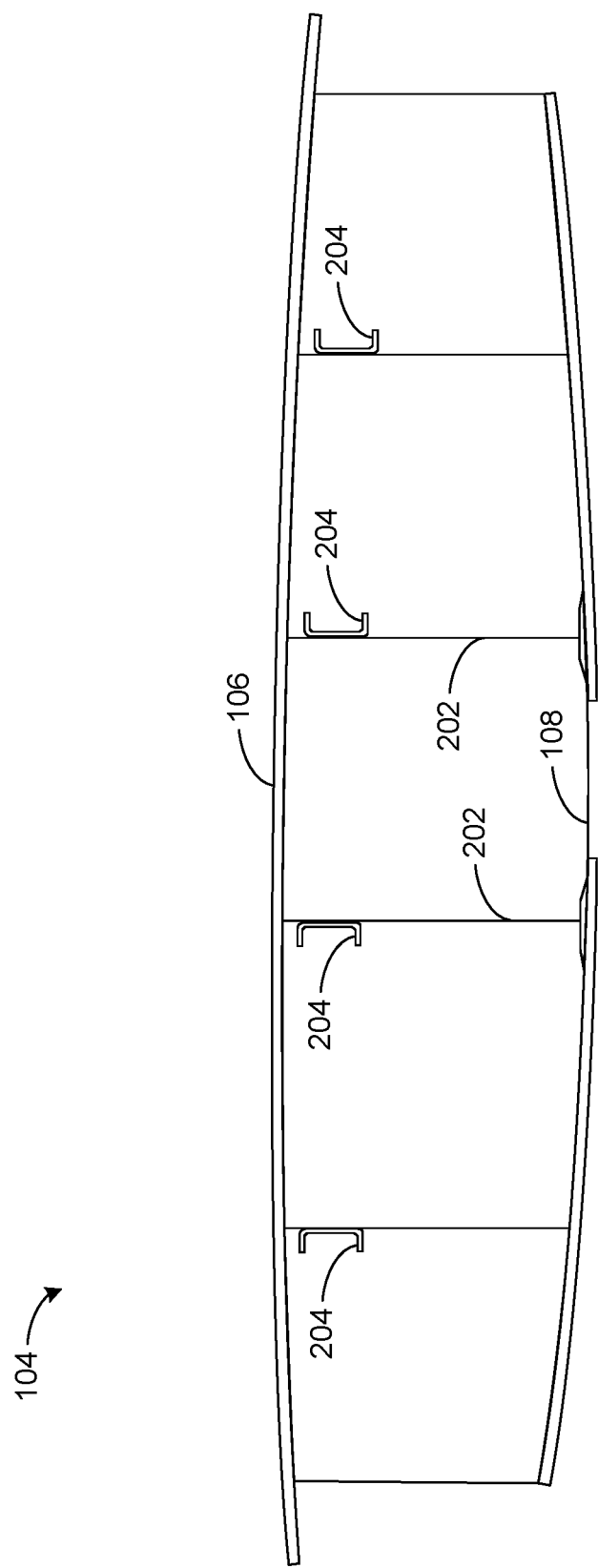
FIG. 5 illustrates a cross-sectional view of an example wing including example ribs, example stiffeners and example panels.

FIG. 5 illustrates a cross-sectional view of the wing 104 including the first and second panels 106, 108, the ribs 202 coupled between the first and second panels 106, 108 and the stiffeners 204 coupled to the ribs 202 immediately adjacent the first panel 106. In the illustrated example, the stiffeners 204 have a c-shaped cross-section. However, the stiffeners 204 may have any other suitable cross-section.

Figure 6:
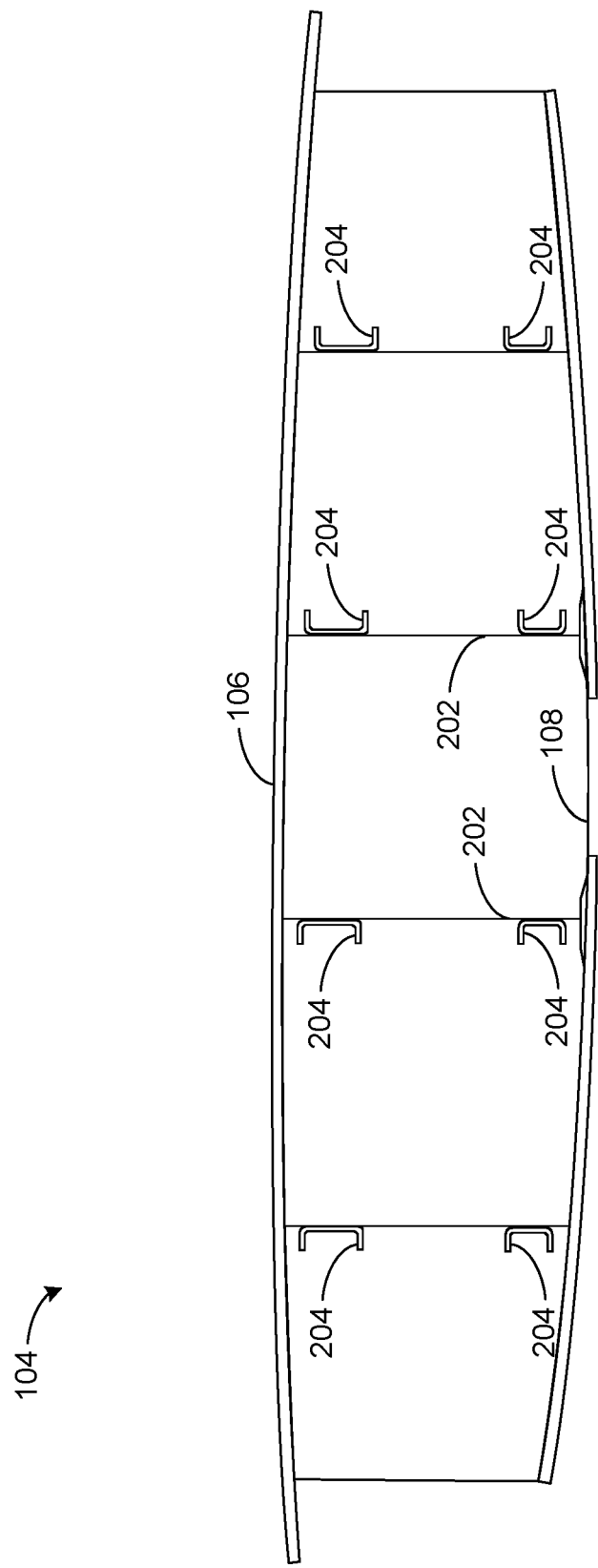
FIG. 6 illustrates a cross-sectional view of another example wing including example ribs, example stiffeners and example panels.

FIG. 6 illustrates a cross-sectional view of the wing 104 including the first and second panels 106, 108, the ribs 202 coupled between the first and second panels 106, 108 and the stiffeners 204 coupled to the ribs 202 immediately adjacent the first panel 106 and immediately adjacent the second panel 108. Positioning the stiffeners 204 adjacent the second panel 108 enables a threshold compressional stability of the second panel 108 to be achieved and/or enables the second panel 108 to be relatively thinner while achieving the threshold compressional stability. In some examples, achieving a threshold compressional stability means that a threshold distance is maintained between the first and second panels 106, 108 and/or first and/or second panels 106, 108 are deterred from buckling.

Figure 7:
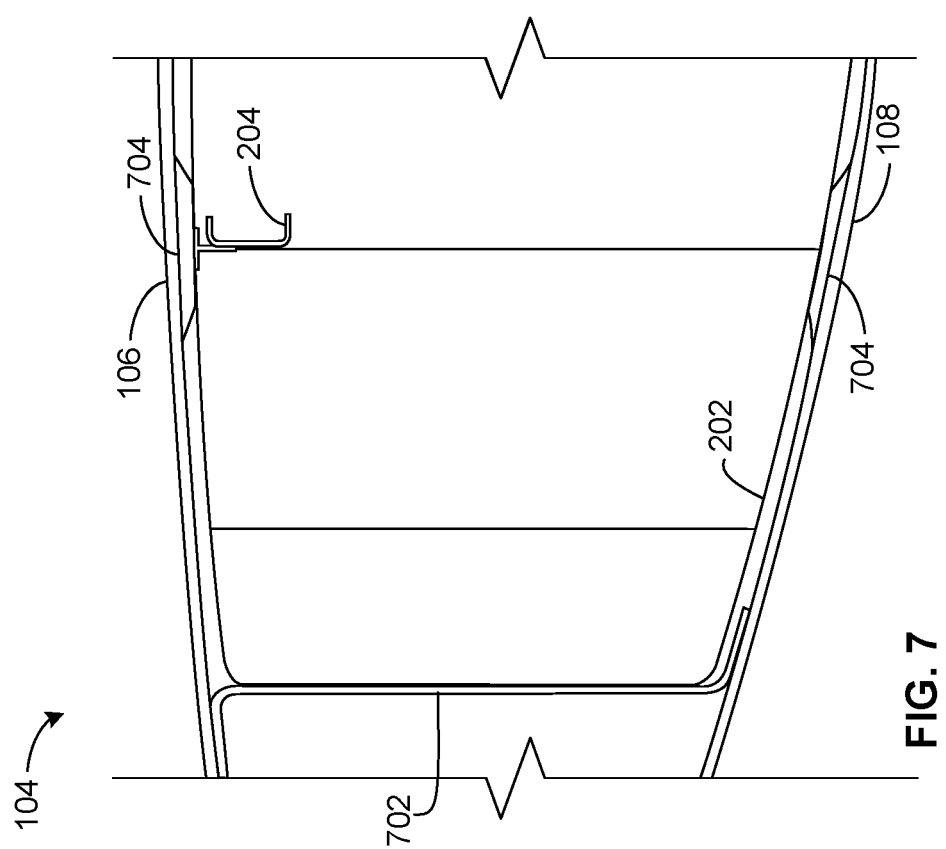
FIG. 7 illustrates a cross-sectional view of another example wing including example ribs, an example stiffener and example panels.

FIG. 7 illustrates a cross-sectional view of the wing 104 including the first and second panels 106, 108, the rib 202, one of the stiffeners 204 and an example spar 702. In the illustrated example, tear straps 704 are disposed between the ribs 202 and the first and second panels 106, 108. However, in some examples, the wings 104 may not be provided with the tear straps 704. Further, in the illustrated example, the spar 702 has a z-shaped cross-section and the stiffener 204 has a c-shaped cross-section. However, the spar 702 and/or the stiffener 204 may have any other cross-section or shape depending on the specific implementation. For example, the spar 702 may have c-shaped cross-section and/or the stiffener 204 may have an L-shaped cross-section.

Figure 8:
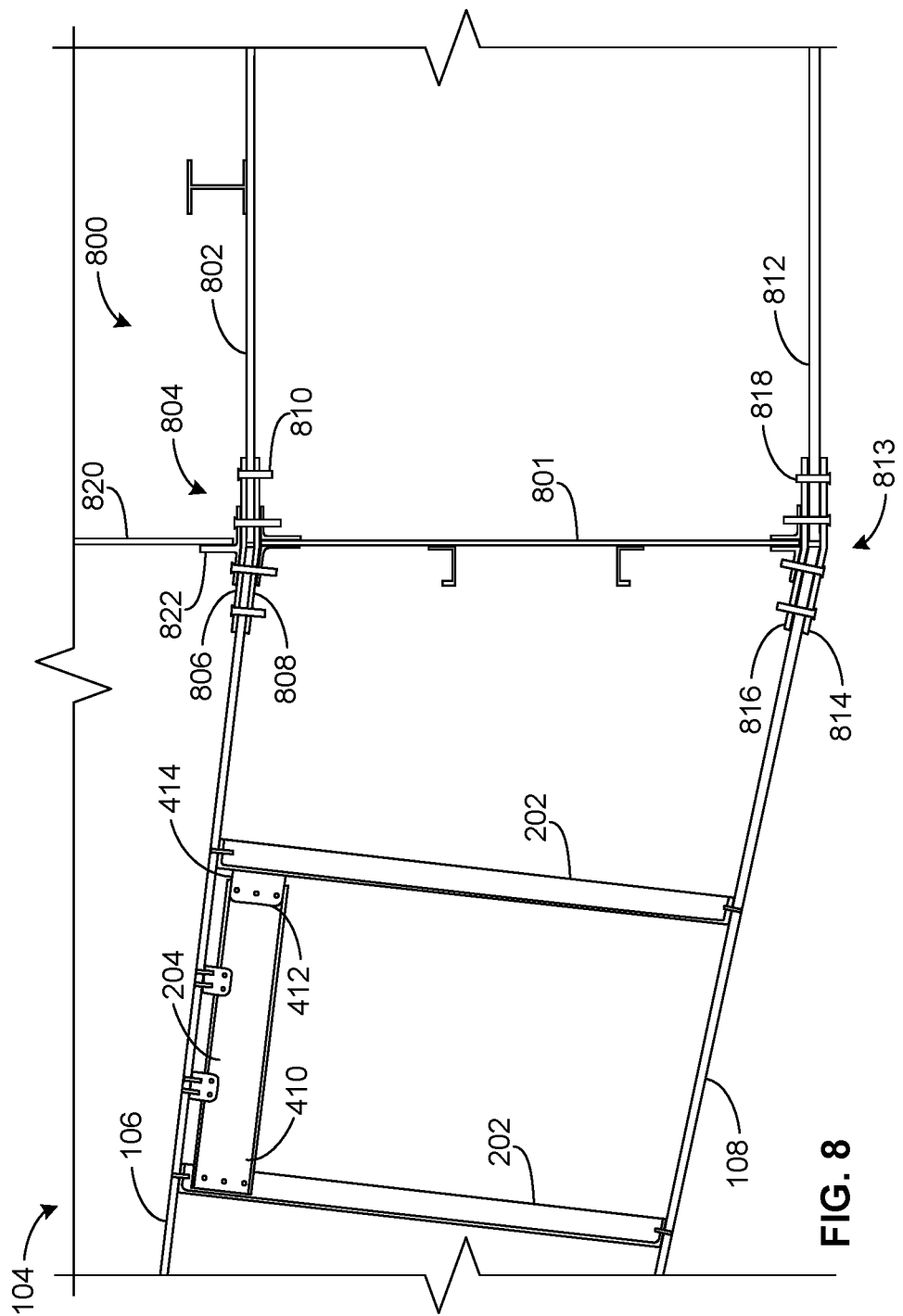
FIG. 8 illustrates a cross-sectional view of an example wing including an example side of body interface, example double shear splices, example panels and an example rib.

FIG. 8 illustrates a cross-sectional view of the wing 104 and a wing center section 800 including the ribs 202, one of the stiffeners 204 and an example side of body interface 801. In the illustrated example, the first panel 106 is coupled to the side of body interface 801 and an internal first panel 802 of the wing center section 800 via an example first double shear splice 804. As shown in the example of FIG. 8, the first double shear splice 804 includes first and second splice plates 806, 808 disposed on either side of the panels 106, 802 and fastened thereto via fasteners and/or bolts 810.

In the illustrated example, the second panel 108 is coupled to the side of body interface 801 and an internal second panel 812 of wing center section 800 via an example second double shear splice 813. In this example, the example second double shear splice 813 includes third and fourth splice plates 814, 816 disposed on either side of the panels 108, 812 and fastened thereto via fasteners and/or bolts 818.

In some examples, the coupling between the panels 106, 108, 802, 812 and/or the side of body interface 801 deters a moment from being created at the interface between any of the first panel 106, the side of body interface 801, the internal first panel 802, the second panel 108 and/or the internal second panel 812.

To couple an example fuselage skin interface 820 to the wing 104, the side of body interface 801 and/or the internal first panel 802, in the illustrated example, an example skin tee and/or bracket 822 is coupled adjacent the side of body interface 801 via one of the fasteners 810. Thus, in the illustrated example, some of the fasteners 810 are used to couple the bracket 822, the first panel 106, the internal first panel 802 and/or the side of body interface 801 together.

Figure 9:
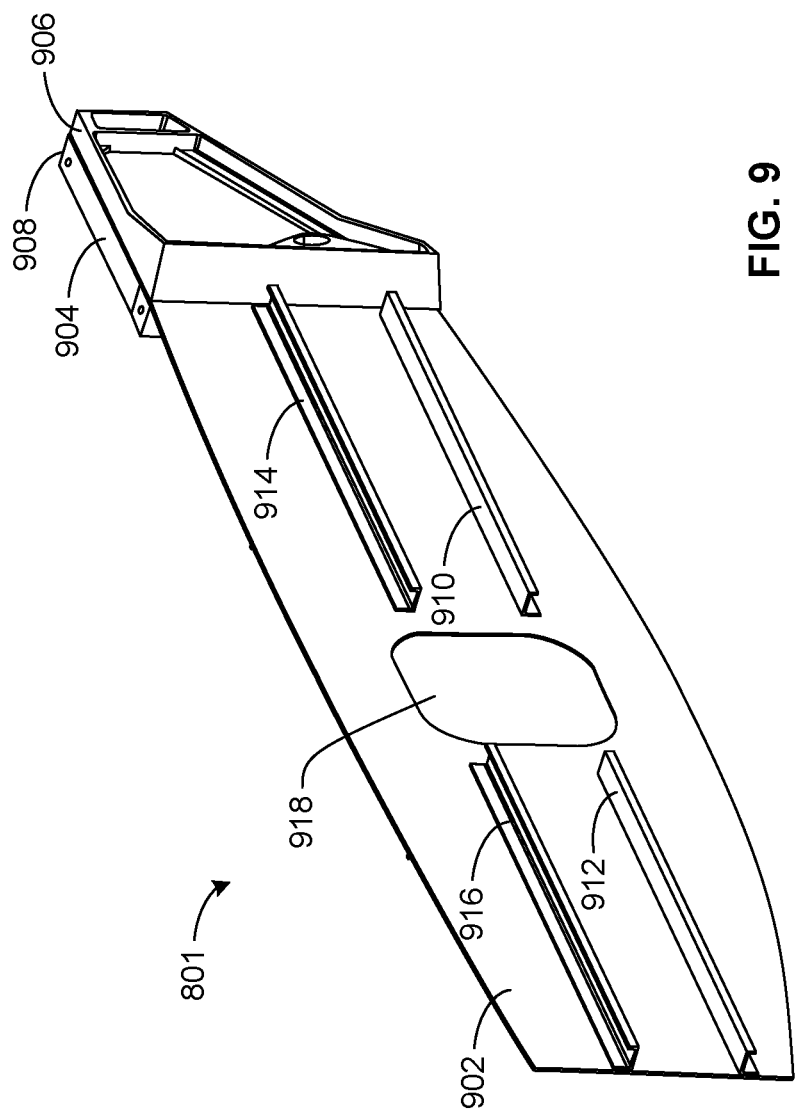
FIG. 9 illustrates an example side of body interface that can be used to implement the example wings disclosed herein.
Figure 10:
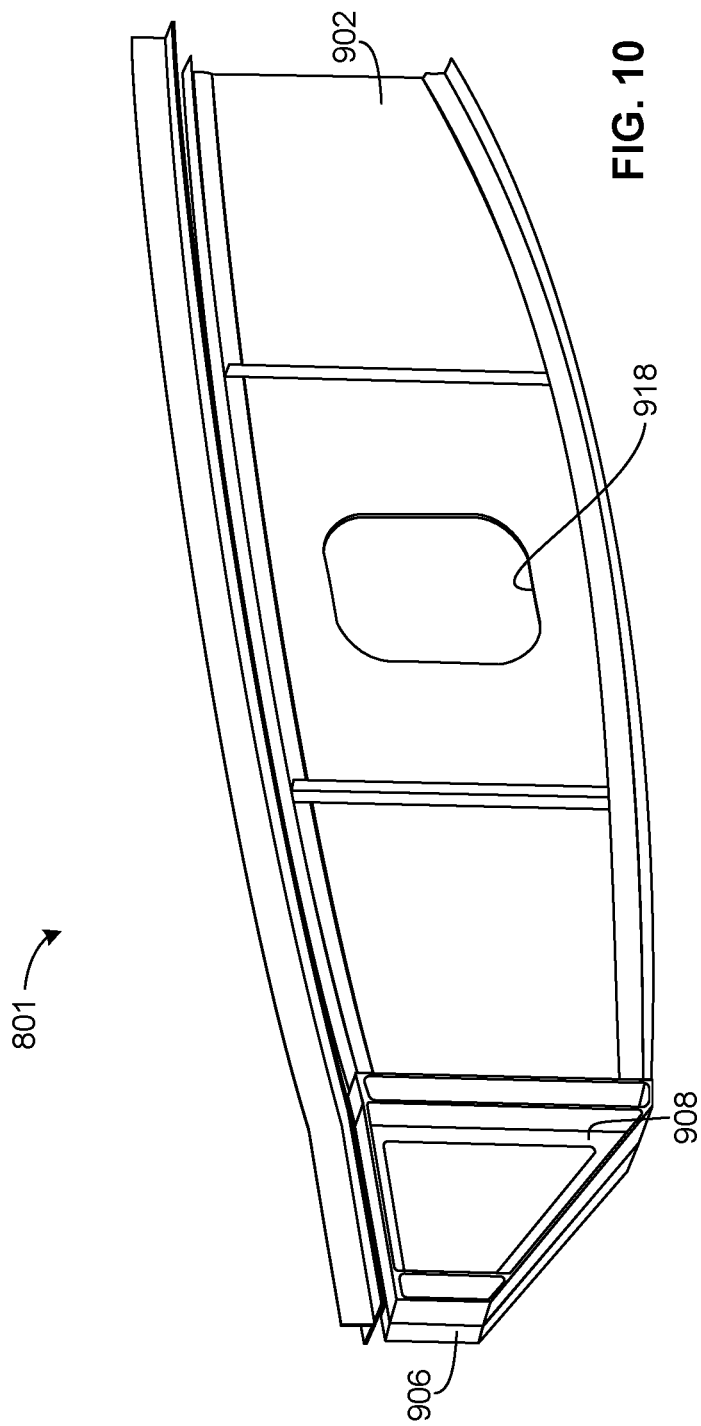
FIG. 10 illustrates another view of the side of body interface of FIG. 9.

FIGS. 9 and 10 illustrate isometric views of the example side of body interface 801 including an example side of body web 902 and first and second fittings and/or trapezoidal fittings 904, 906 through which the side of body web 902 extends. In the illustrated example, extending the side of body web 902 through the first and second fittings 904, 906 enables forces to be transferred from the first and/or second panels 106, 108 through the side of body web 902 to a rear spar to be positioned adjacent an end 908 of the side of body interface 801. In this example, the side of body interface 801 includes horizontal members 910, 912, 914, 916 and an aperture 918 to enable operators (e.g., mechanics) to pass through the side of body interface 801 when repairing the wing 104, for example.

Figure 11:
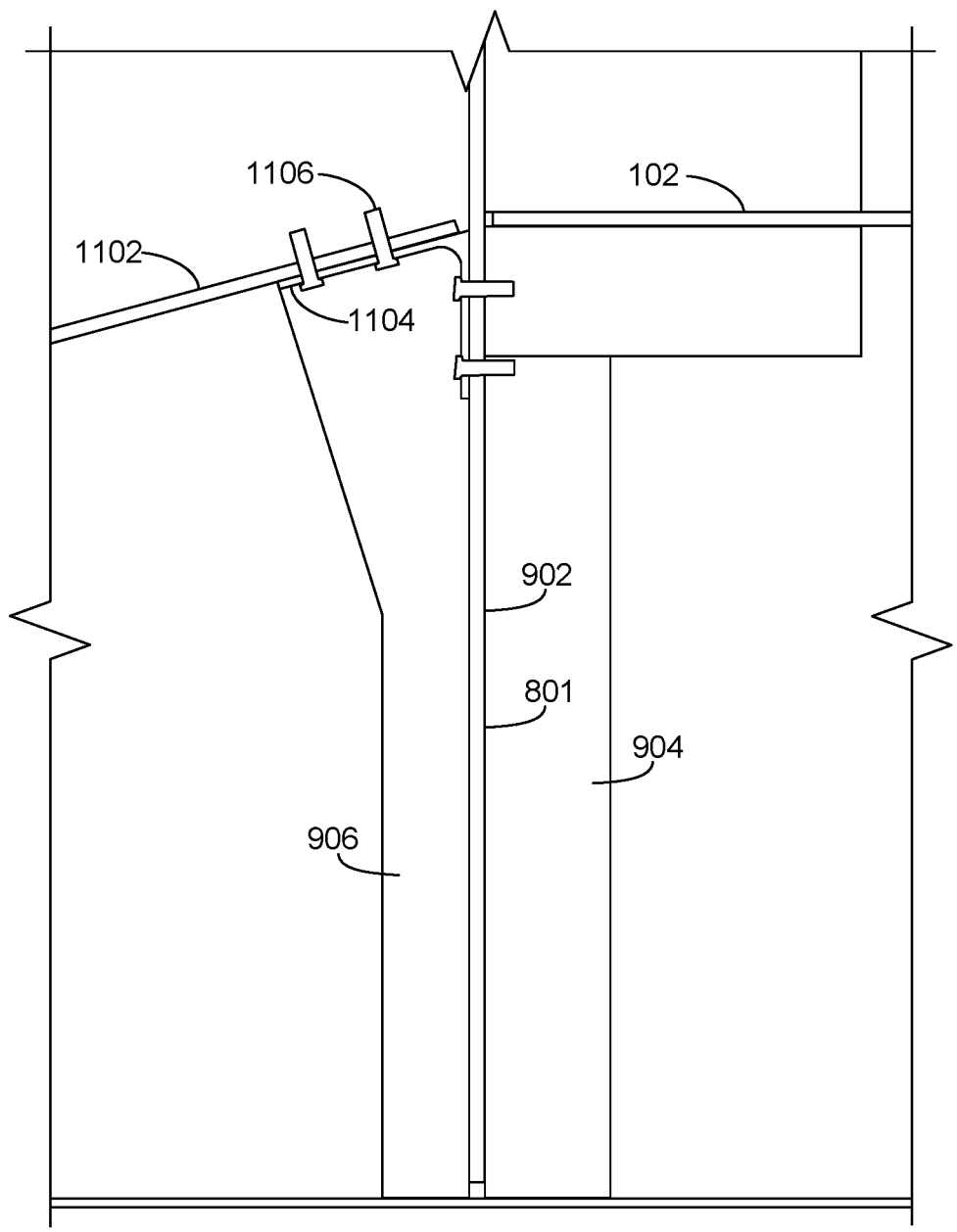
FIG. 11 illustrates an expanded view of a coupling between an example side of body interface and an example rear spar.

FIG. 11 illustrates the example side of body interface 801, the trapezoidal fittings 904, 906 and an example rear spar 1102 being coupled via a bracket 1104 and fasteners 1106. As illustrated in the example of FIG. 11, the side of body web 902 extends continuously through the trapezoidal fittings 904, 906 toward the rear spar 1102 to enable loads and/or forces to be transferred from the side of body web 902 to, for example, the rear spar 1102.

Figure 12:
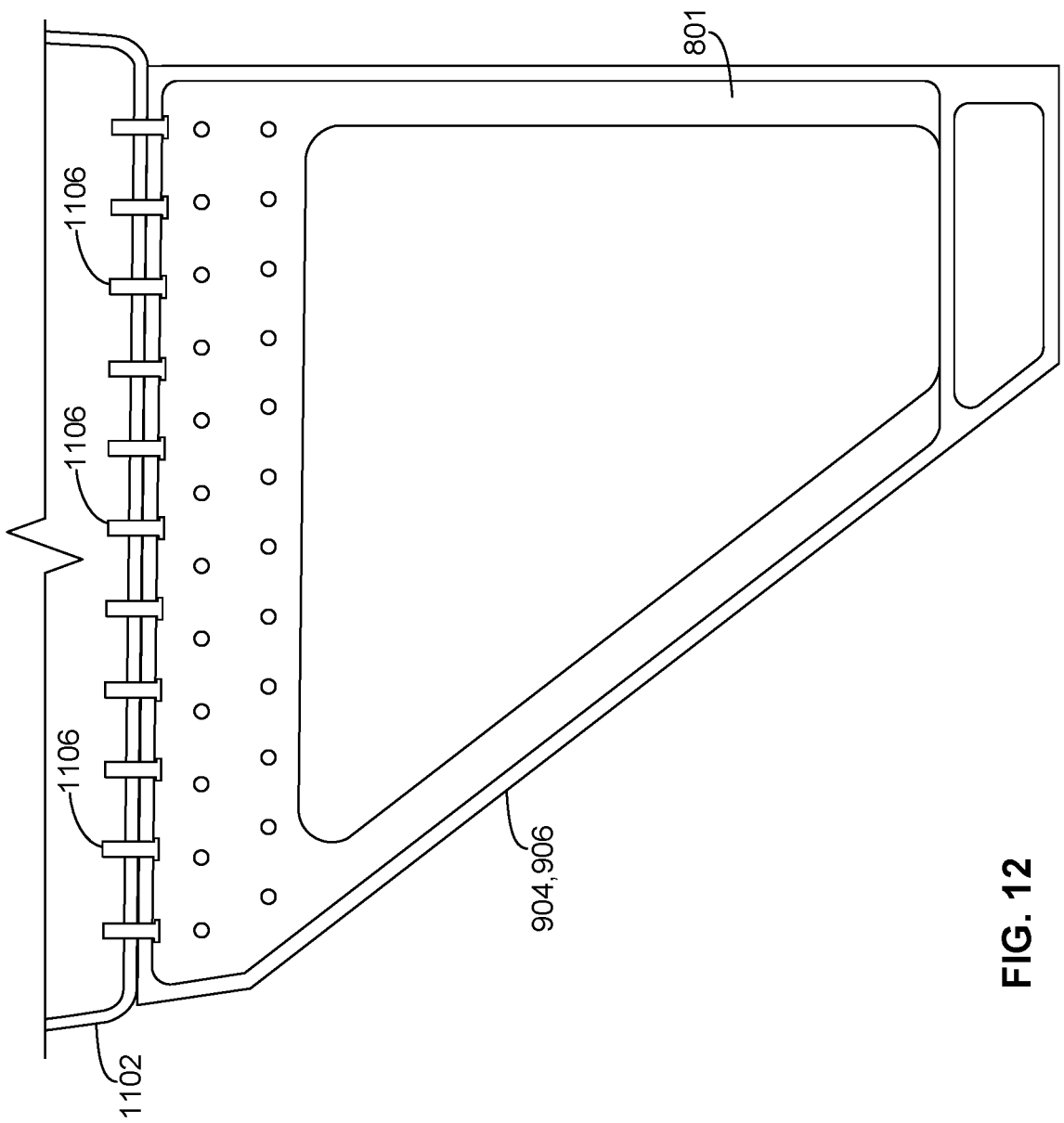
FIG. 12 illustrates another view of a coupling between an example side of body interface and an example rear spar.

FIG. 12 illustrates an example coupling between the first and second trapezoidal fittings 904, 906 and the rear spar 1102. In this example, the fasteners 1106 extend through the fittings 904, 906 and the rear spar 1102 to couple the fittings 904, 906 and the rear spar 1102.

Figure 13:
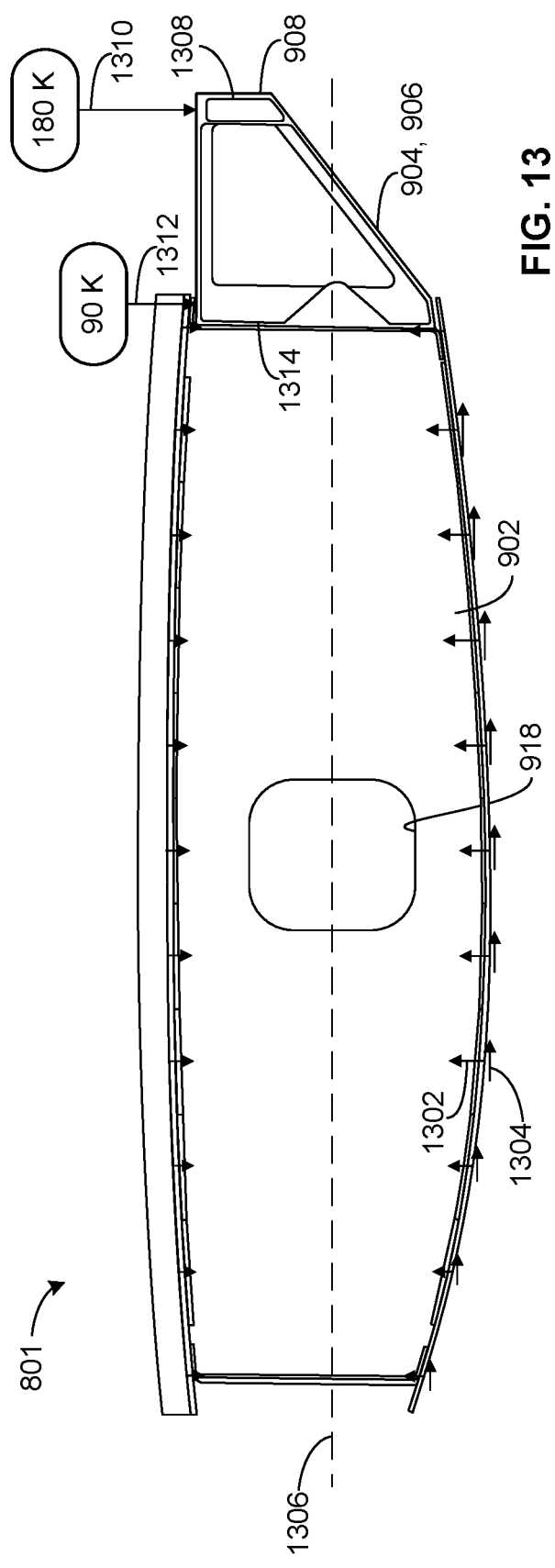
FIG. 13 illustrates forces imparted on an example side of body interface that can be used to implement the example wings disclosed herein.

FIG. 13 illustrates first and second forces 1302, 1304 being imparted on the side of body interface 801. In this example, the first forces 1302 are directed along a longitudinal axis 1306 of the side of body interface 801 and the second forces 1304 are directed toward a first side 1308 of the fittings 904, 906. In the illustrated example, third forces 1310 (e.g., 180K pounds of force) at the first side 1308 of the fittings 904, 906 are greater than fourth forces 1312 (e.g., 90K pounds of force) at a second side 1314 of the fittings 904, 906 and/or the side of body web 902.

Figure 14:
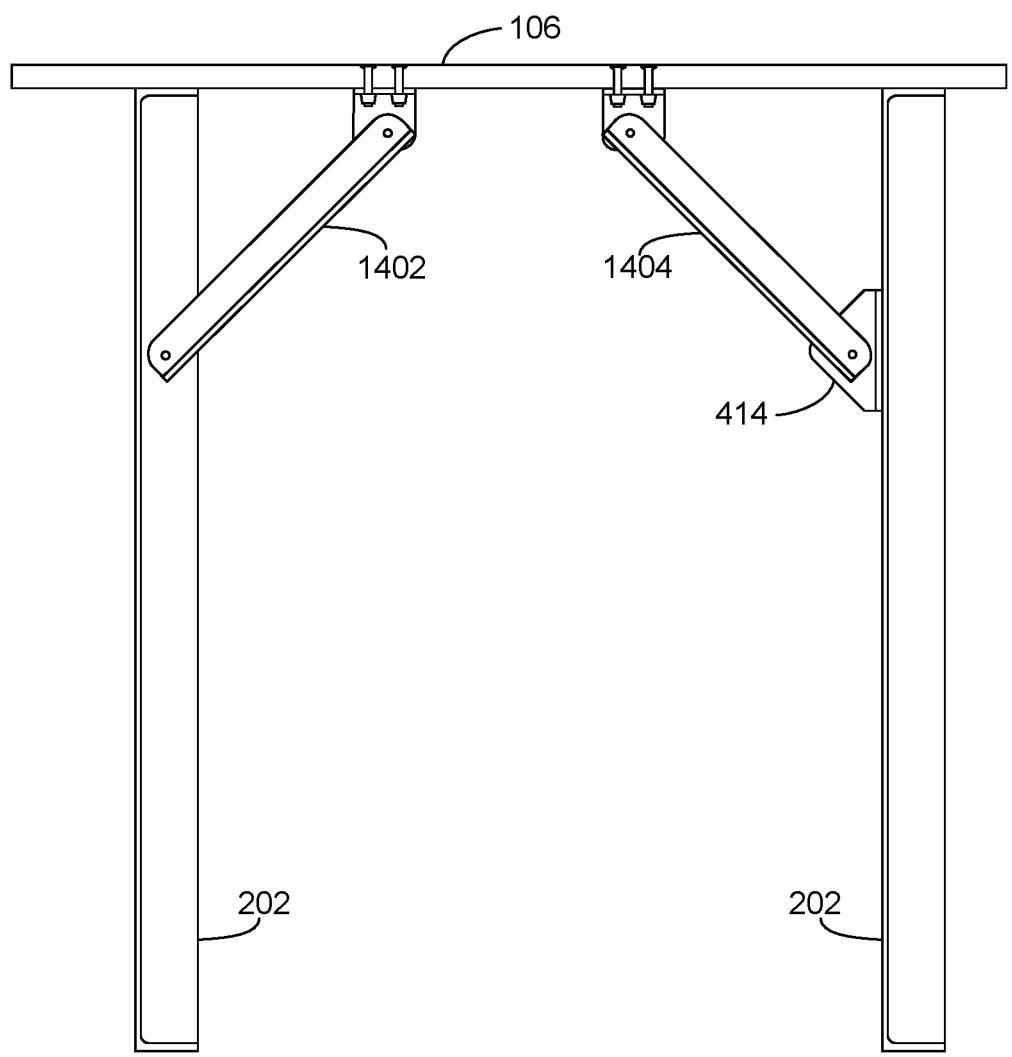
FIG. 14 illustrates example stiffeners coupled to an example panel that can be used to implement the example wings disclosed herein.

FIG. 14 illustrates example first and second stiffeners 1402, 1404 coupled between the ribs 202 and the first panel 106. In contrast to the example stiffeners 204 discussed above, the example stiffeners 1402, 1404 have ends coupled between one of the ribs 202 and the first panel 106.

Figure 15:
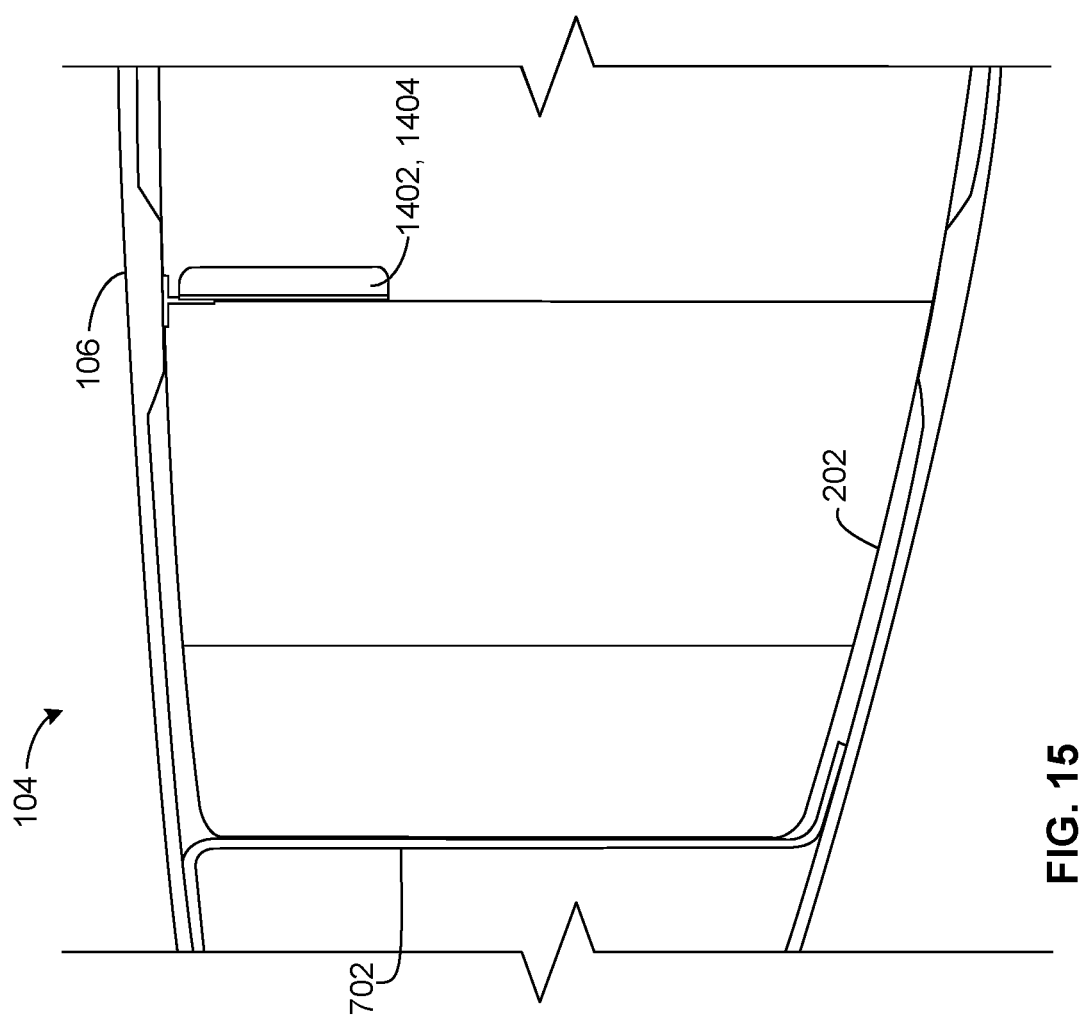
FIG. 15 illustrates a cross-sectional view of another example wing including example ribs, an example stiffener and example panels.

FIG. 15 illustrates a cross-sectional view of the first and second panels 106, 108, the ribs 202 and one of the stiffeners 1402, 1404.

Figure 16:
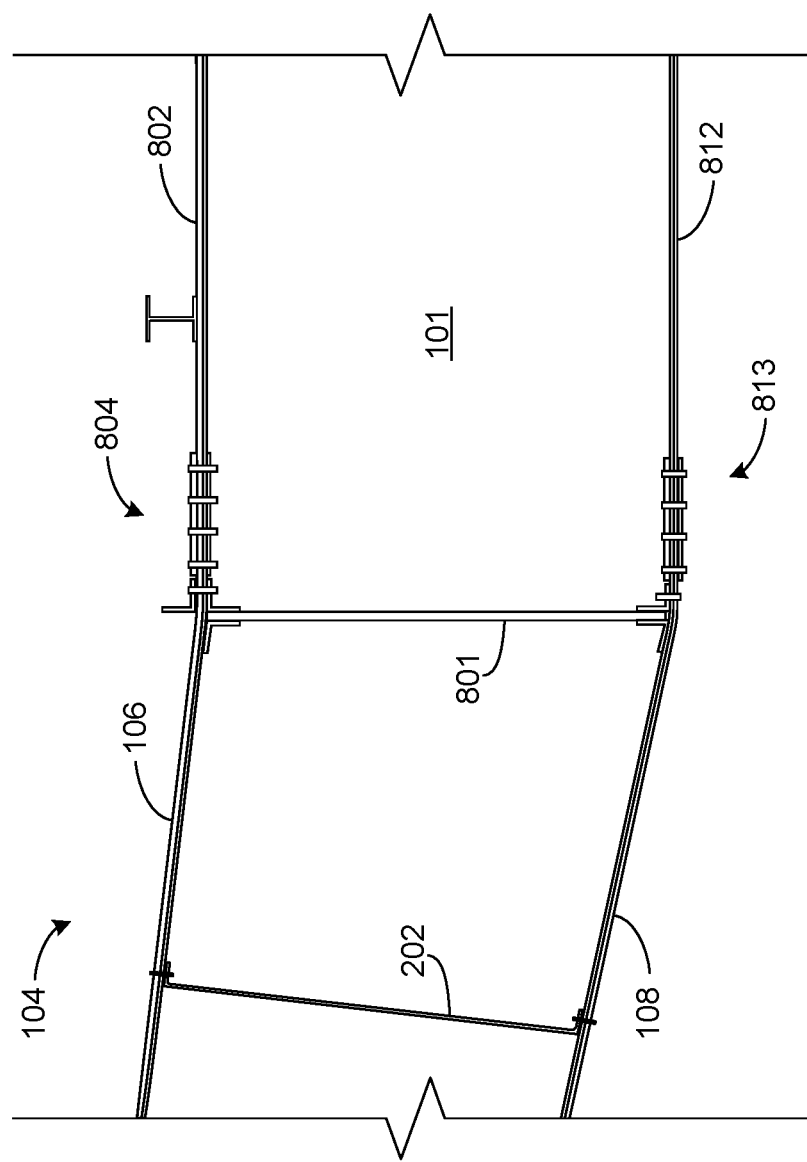
FIG. 16 illustrates a cross-sectional view of another example wing including an example side of body interface, example double shear splices and example panels.

FIG. 16 illustrates a cross-sectional view of the wing 104 and the fuselage 101 including one of the ribs 202 and the example side of body interface 801. In contrast to the example of FIG. 8, the first double shear splice 804 is spaced from the example side of body interface 801 and the second double shear splice 813 is spaced from the example side of body interface 801. In some examples, by spacing the double shear splices 804, 813 from the side of body interface 801, the assembly of the wing can be simplified.

From the foregoing, it will be appreciated that the above disclosed methods, apparatus and articles of manufacture relate to decreasing the cost of producing aircraft wings and/or aircraft wings including carbon fiber reinforced plastic (CFRP) by using example stiffeners that extend between ribs. In some examples, the stiffeners are configured to not pick up axial forces and/or loads from the wing panels by non-rigidly coupling the stiffeners and the wing skin panels to deter the axial loads from being received by the stiffeners. In some examples, the example wings disclosed herein include upper and lower wing skin panels, stiffeners and/or intercostals coupled to the upper and/or lower skin panels to enable a threshold wing skin panel stability to be achieved. In some examples, the stiffeners and/or intercostals are disposed spanwise between the ribs. Using the examples disclosed herein enables a double shear splice to be used at the side of body joint via carbon fiber reinforced plastic splice elements and/or plates. In some examples, the use of the example stiffeners as disclosed herein enables a continuous side of body web to extend through aft trapezoidal panel(s) of the rear spar and/or simplifies a side of body joint to enable terminal fittings not to be included and/or used.

An example apparatus includes an aircraft wing having a first panel; a second panel; ribs coupled between the first and second panels; and stiffeners coupled between the ribs in a spanwise direction and to the first panel, the coupling between the stiffeners and the first panel to deter axial loads from being received by the stiffeners, the stiffeners to increase a compressional stability of the first panel. In some examples, the first panel includes composite or carbon fiber reinforced plastic. In some examples, a first number of the stiffeners are coupled between the ribs on an inner portion of the aircraft wing and a second number of the stiffeners are coupled between the ribs at an outer portion of the wing, the first number being greater than the second number, the inner portion to be coupled to a fuselage of an aircraft. In some examples, the aircraft wing is configured to retain the axial loads within the first and second panels.

In some examples, the apparatus includes a side of body web coupled to the first and second panels. In some examples, the side of body web includes composite or carbon fiber reinforced plastic. In some examples, the side of body web is to extend along a side of a fuselage of an aircraft. In some examples, the apparatus includes trapezoidal fittings through which the side of body web extends, the trapezoidal fittings to be coupled to a rear spar of the aircraft wing to enable the axial loads to be transferred from the first and second panels to the rear spar. In some examples, the apparatus includes a splice plate coupling the first panel and the side of body web.

In some examples, the apparatus includes brackets to couple an end of the respective stiffeners and the ribs, the brackets to deter buckling of the stiffeners based on material properties or flexibility of the brackets. In some examples, the stiffeners are first stiffeners, and further including second stiffeners coupled to and between the ribs in a spanwise direction and to the second panel, the second stiffeners to increase a compressional stability of the second panel. In some examples, the coupling between the stiffeners and the first panel are indirect couplings formed via clips, the couplings formed via the clips deter the axial loads from being received by the stiffeners while increasing the compressional stability of the first panel.

An example apparatus includes a fuselage; an aircraft wing, including: a first panel; a second panel; ribs coupled between the first and second panels in a chordwise direction; and stiffeners coupled to at least one of the ribs and to the first panel, the stiffeners to increase a compressional stability of the first panel, the coupling between the stiffeners and the first panel to enable axial loads to be retained within the first panel; and a side of body web coupled to the first and second panels and the fuselage.

In some examples the apparatus includes fittings through which the side of body web extends, the fittings to be coupled to a rear spar of the aircraft wing to enable the axial loads to be transferred from the first panel to the rear spar. In some examples, the apparatus includes brackets to couple an end of the respective stiffeners and the ribs, the bracket to deter buckling of the stiffeners. In some examples, the stiffeners include first stiffeners and second stiffeners, the first stiffeners coupled to a bracket to deter buckling of the first stiffeners. In some examples, the coupling between the stiffeners and the first panel are indirect couplings formed via clips, the couplings formed via the clips enable the axial loads to be retained within the first panel.

An example apparatus includes a fuselage; an aircraft wing including first and second panels, the aircraft wing being configured to enable axial loads to be retained within the first and second panels; and a side of body web coupled to the first and second panels and the fuselage, based on the coupling between the side of body web and the first and second panels, the side of body web to receive a portion of the axial loads from the first and second panels. In some examples, the aircraft wing further includes ribs coupled between the first and second panels in a chordwise direction and stiffeners coupled to and between the ribs in a spanwise direction and to the first panel, based on the coupling between the stiffeners and the first panel, the stiffeners to increase a compressional stability of the first panel. In some examples, the stiffeners are spaced away from the first panel to deter the axial loads from being received by the stiffeners. In some examples, the coupling between the stiffeners and the first panel are indirect couplings formed via clips, the couplings formed via the clips deter the axial loads from being received by the stiffeners while increasing the compressional stability of the first panel. In some examples, the apparatus includes fittings through which the side of body web extends, the fittings to be coupled to a rear spar of the aircraft wing to enable the axial loads to be transferred from the first and second panels to the rear spar.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    an aircraft wing including:
        a first panel;
        a second panel;
        ribs coupled between the first and second panels, the ribs spaced apart from each other and disposed throughout a portion of a length of the aircraft wing; and
        stiffeners coupled between adjacent ones of the ribs in a spanwise direction and to the first panel, wherein each of the stiffeners is spaced apart from the first panel, and wherein each of the stiffeners is coupled to the first panel via one or more clips extending between the respective stiffener and the first panel.

2. The apparatus of claim 1, wherein the first panel includes composite or carbon fiber reinforced plastic.

3. The apparatus of claim 1, wherein the aircraft wing is configured to retain axial loads within the first and second panels.

4. The apparatus of claim 1, further including a side of body web coupled to the first and second panels.

5. The apparatus of claim 4, wherein the side of body web includes composite or carbon fiber reinforced plastic.

6. The apparatus of claim 4, wherein the side of body web is to extend along a side of a fuselage of an aircraft.

7. The apparatus of claim 4, further including trapezoidal fittings through which the side of body web extends, the trapezoidal fittings to be coupled to a rear spar of the aircraft wing to enable axial loads to be transferred from the first and second panels to the rear spar.

8. The apparatus of claim 4, further including a splice plate coupling the first panel and the side of body web.

9. The apparatus of claim 1, further including brackets to couple an end of the respective stiffeners and the ribs, the brackets to deter buckling of the stiffeners based on material properties or flexibility of the brackets.

10. The apparatus of claim 1, wherein the stiffeners are first stiffeners, and further including second stiffeners coupled to and between the ribs in a spanwise direction and to the second panel, the second stiffeners to increase a compressional stability of the second panel.

11. The apparatus of claim 1, wherein the aircraft wing includes a rear spar, further including:
    a fuselage;
    a side of body web coupled to the first and second panels and the fuselage; and
    a first fitting coupled to a first side of the side of body web and a second fitting coupled to a second side of the side of body web opposite the first fitting, the first and second fittings orientated parallel to each other and the side of body web, the first and second fittings coupled to the rear spar to enable axial loads to be transferred from the first panel to the rear spar.

12. The apparatus of claim 11, further including brackets to couple an end of the respective stiffeners and the ribs, the brackets to deter buckling of the stiffeners.

13. The apparatus of claim 11, wherein the stiffeners include first stiffeners and second stiffeners, the first stiffeners coupled to respective brackets to deter buckling of the first stiffeners.

14. A method of using the apparatus of claim 11, comprising:
    flying an aircraft including the fuselage and the aircraft wing;
    receiving axial loads on the first panel; and
    directing the axial loads toward the fuselage.

15. The apparatus of claim 11, wherein the first fitting has a trapezoidal shape with a forward end and an aft end opposite the forward end, the forward end being larger than the aft end, the rear spar coupled to the forward end of the first fitting.

16. The apparatus of claim 1, wherein each of the stiffeners has a C-shaped cross-section having a main body, a first flange extending from a first edge of the main body, and a second flange extending from a second edge of the main body, and wherein each of the stiffeners is oriented such that the main body is orientated substantially perpendicular to the first panel and the first flange is oriented substantially parallel to the first panel.

17. An apparatus comprising:
    a fuselage;

an aircraft wing including:
- a first panel;
- a second panel; panels,
- ribs coupled between the first and second panels in a chordwise directions; and
- stiffeners coupled to and between adjacent ones of the ribs in a spanwise direction and coupled to the first panel, wherein each of the stiffeners has a first end coupled directly to one of the ribs and a second end, opposite the first end, coupled to an adjacent one of the ribs via a flange to enable a non-rigid coupling between each of the stiffeners and the ribs; and a side of body web coupled to the first and second panels and the fuselage.

18. The apparatus of claim 17, wherein, based on the coupling between the stiffeners and the first panel, the stiffeners to increase a compressional stability of the first panel.

19. The apparatus of claim 17, further including fittings through which the side of body web extends, the fittings to be coupled to a rear spar of the aircraft wing to enable axial loads to be transferred from the first and second panels to the rear spar.

* * * * *

UNITED STATES PATENT AND TRADEMARK OFFICE
CERTIFICATE OF CORRECTION

PATENT NO.         : 10,696,373 B2                                              Page 1 of 1
APPLICATION NO.    : 15/264209
DATED              : June 30, 2020
INVENTOR(S)        : Walker et al.

It is certified that error appears in the above-identified patent and that said Letters Patent is hereby corrected as shown below:

In the Claims

Claim 17
Column 9, Line 3:
Delete "panels,"
Column 9, Line 5:
Replace "directions;" with -- direction; --

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*